Jan. 25, 1944.   R. SCHNARZ   2,340,083
SPOT WELDER
Filed Aug. 6, 1937   3 Sheets-Sheet 1

WITNESSES:

INVENTOR
Richard Schnarz.
BY
F. W. Lyle.
ATTORNEY

Jan. 25, 1944.      R. SCHNARZ      2,340,083
SPOT WELDER
Filed Aug. 6, 1937      3 Sheets-Sheet 2

WITNESSES:
Leon M. Garman
Hymen Diamond

INVENTOR
Richard Schnarz.
BY
F. W. Lyle.
ATTORNEY

Jan. 25, 1944.   R. SCHNARZ   2,340,083
SPOT WELDER
Filed Aug. 6, 1937   3 Sheets-Sheet 3

INVENTOR
Richard Schnarz.

Patented Jan. 25, 1944

2,340,083

UNITED STATES PATENT OFFICE 2,340,083

SPOT WELDER

Richard Schnarz, Berlin-Siemensstadt, Germany, assignor to Westinghouse Electric & Manufacturing Company, East Pittsburgh, Pa., a corporation of Pennsylvania Application August 6, 1937, Serial No. 157,633
In Germany September 29, 1936

5 Claims. (Cl. 250—27)

For the spot welding of certain metal, particularly for very thin sheets of metal, welding devices are required in which the welding circuit is connected to the feeding alternating current network at most during a half-wave of the alternating current potential. The proposal has been made to connect the welding transformer to an alternating current source through a single anode grid-controlled gas or vapor discharge vessel with an arc-like discharge, for example, through a hot cathode mercury vapor discharge vessel for this purpose, and to so dimension the grid potential supplied to the controlled grid of this discharge vessel that the discharge vessel is only conducting during at most one-half wave of the alternating current potential.

The object of the invention is a control device designed for the control circuit of the discharge vessel which fulfills the foregoing control requirements in a particularly simple and advantageous manner.

In accordance with the invention a resistor is connected in the grid circuit of the single anode discharge vessel feeding the welding transformer through which a direct current circuit is closed for the purpose of varying the grid potential by igniting an auxiliary discharge vessel with gas or vapor filling.

Further details of the invention and the advantages attainable by the invention will be explained with reference to the exemplary embodiments illustrated in the drawings, in which Figure 1 is a diagrammatic view showing an embodiment of my invention.

Figure 1:
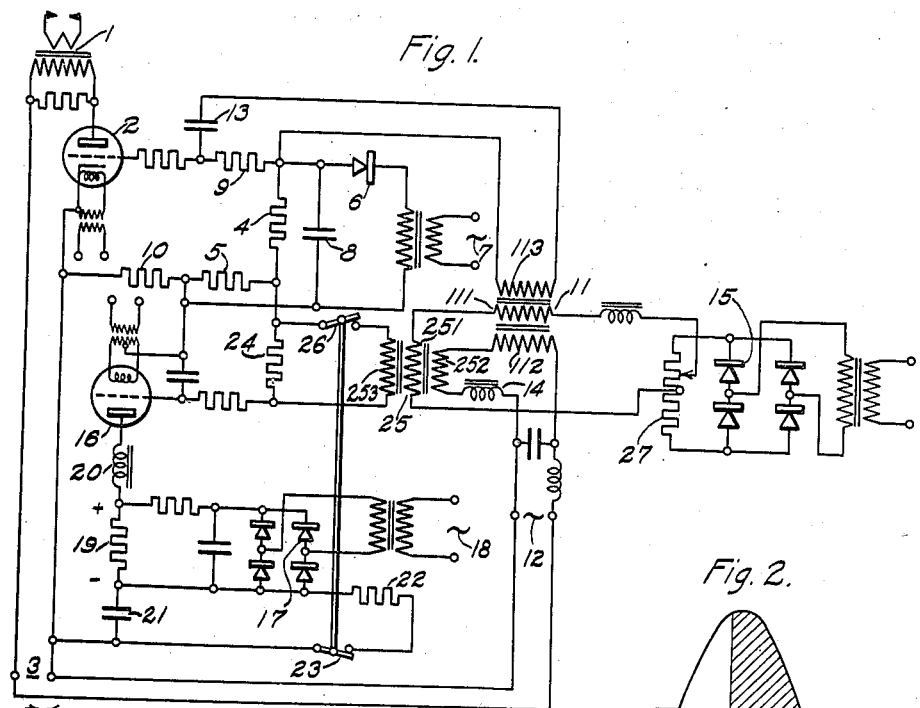

In Figure 1 the welding transformer 1 is connected to an alternating current network 3 through a grid controlled hot cathode discharge vessel with gas or vapor filling, for example, a mercury vapor discharge vessel 2. In the grid circuit of the discharge vessel 2 there are two resistors 4 and 5 which are connected to an alternating current potential through a rectifier 6. The potential drop of the two resistors produces in the grid circuit a constant negative bias potential.

Further, a resistor 9 is connected in the grid circuit of the discharge vessel 2. The latter is connected to the secondary winding of a transformer 11 the core of which is highly saturated and which has a direct current supply exciting winding 111 and an alternating current supply exciting winding 112. The latter winding is connected to an alternating current potential source 12 through a choke 14. By the functioning of the choke 14 an alternating current of constant curve shape, for example, a triangular shaped current, is produced in the exciting winding 112. In the secondary winding 113 a potential peak is manifested the phase position of which with reference to the potential 12 is displaced with the aid of a capacitor 13 for purposes to be explained more in detail later. The direct current excitation winding 111 is connected to the alternating current potential in known manner in series with a regulable resistor 27 through a rectifier 15. The potential peaks produced on the resistor 9 and the negative potential of the two resistors 4 and 5 are so dimensioned that the potential peaks of the resistor 9 are not sufficient to ignite the discharge vessel 2.

To release the discharge vessel 2 during at most a half wave a further resistor 10 is connected in the grid circuit. A direct current circuit, in which an auxiliary discharge vessel 16, a choke 20, a direct current source 19 and a capacitor 21 are connected, lies parallel to the resistor 10. As direct current source, the potential drop across a resistor 19 serves in the exemplary embodiment; the resistor 19 is connected through a rectifier 17 to an alternating current source 18. The auxiliary discharge vessel 16 is, as is the main discharge vessel 2, a discharge vessel with gas or vapor filling and an arc-like discharge. Preferably a grid controlled hot cathode tube with mercury vapor filling is utilized.

In the grid circuit of the auxiliary discharge vessel 16 a negative potential derived from the resistor 5 and a potential peak produced by a transformer 25 at the resistor 24 are impressed. The latter transformer is as is the transformer 11 provided with a direct current exciting winding 251 and an alternating current exciting winding 252. In the circuit of the secondary winding 253 an auxiliary switch 26 is connected by the operation of which the welding process is started. This switch is so connected to the contacts 23 that the contacts 23 (rest contacts) are closed when the switch 26 (operating contact) is opened and vice versa.

The operation of the circuit of Fig. 1 is as follows: As long as the switch 26 is opened and correspondingly the contacts 23 are closed, both discharge vessels 2 and 16 are blocked. In the grid circuit of the discharge vessel 2 the negative blocking potential of the two resistors 4 and 5 and the potential peaks of the resistor 9 are present; the latter, however, is not sufficient to remove the blocking of the discharge vessel 2. In the grid circuit of the discharge vessel 16 the blocking potential of the resistor 5 acts and through it the discharge vessel 16 is prevented from becoming ignited.

To start the welding process, the switch 26 is closed. In the grid circuit of the discharge vessel 16 potential peaks appear which are produced through the transformer 25 on the resistor 24 and they ignite the discharge vessel 16. The time point of this ignition depends on the adjustment of a resistor 27 which is connected in the direct current exciting circuits of the two transformers 11 and 25. The potential peaks of the resistor 24 may in this manner be displaced in phase with reference to the potential of the feeding alternating current network 3 within the range of a half wave. The alternating current potential 12 for the two transformers 11 and 25 may in this connection be derived from the alternating current network 3 as shown; at least, however, there must be a definite invariable phase relationship between the potentials 3 and 12. After the closing of the switch 26 the auxiliary discharge vessel 16 is ignited at the instant at which the potential peaks are manifested in the secondary winding 253 of the transformer 25.

At the ignition of the auxiliary discharge vessel 16 a direct current circuit is closed through the resistor 10, the discharge vessel 16, the choke coil 20, the resistor 19 and the capacitor 21 through which the capacitor 21 is charged. At the instant of the closing of the latter circuit a pitential peak appears on resistor 10 the phase portion of which is determined by the potential peaks in the grid circuit of the discharge vessel 16. In the grid circuit of the main discharge vessel 2, two potential peaks now act and these appear on the resistors 9 and 10. The sum of these two peaks is so dimensioned that it exceeds the negative potential of the resistors 4 and 5 to such an extent that the discharge vessel is ignited. The circuit of the welding transformer 1 is closed thereby and an arc burns in the discharge vessel until the current of the alternating current network 3 passes through zero; the time during which the arc burns is a measure of the energy amount supplied to the welding circuit.

The potential peaks in resistor 10 decrease after the ignition of the discharge vessel 16 to the extent to which the capacitor 21 connected in series with the discharge vessel is charged. As soon as the charging process is finished the potential on resistor 10 is discontinued and the discharge vessel 16 is extinguished because the operating anode potential is absent. The discharge vessel 16 now remains blocked even if the auxiliary switch 26 in the secondary circuit of the transformer 25 is maintained closed for a more or less lengthy time. A new ignition of the discharge vessel 16 may only take place if the capacitor 21 is discharged through the parallel resistor 22 and that is only possible if the auxiliary switch 26 is opened and thereby the auxiliary contacts 23 are closed.

The grid potential of the main discharge vessel 2 is, as appears from the foregoing, composed of an invariable negative direct current potential of the resistors 4 and 5 and a potential peak opposite to this direct current potential and accordingly positive in polarity which is varied in dependence upon the ignition process or the discharge process of the auxiliary discharge vessel 16. This variation takes place in such manner that only during a short time the ignition requirements for the main discharge vessel 2 are fulfilled, and indeed only one time during the switching in of the auxiliary switch 26. It is of particular advantage to dimension one of the two potential peaks in the grid circuit of the discharge vessel 2 for a somewhat longer time than the other. For this purpose the choke coil 20 is connected in the circuit of the discharge vessel 16 and it somewhat widens the potential peaks of the resistor 10 and flattens out its maximum value. Further, the potential peaks of the resistor 9 are somewhat displaced in time with reference to potential peaks of the resistor 10 to increase the certainty and the accuracy of the ignition of the main discharge vessel.

Figure 2:
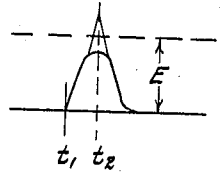
Fig. 2 is a graph illustrating the operation of the circuit shown in Fig. 1.

In Fig. 2 the operation is illustrated in a diagram. At a time point $t_1$ the discharge vessel 16 is ignited by the potential peaks of the transformer 25. Somewhat later at the time point $t_2$ the potential peaks at the resistor 9 appear in the grid circuit of the main discharge circuit 2. At this instant the potential on resistor 10 has attained its maximum value and the sum of the potentials of the resistors 10 and 9 become so long for a short time that the blocking potential E of the discharge vessel 2 is exceeded. At the time point $t_2$ the circuit of the welding transformer is thus closed.

Figure 3:
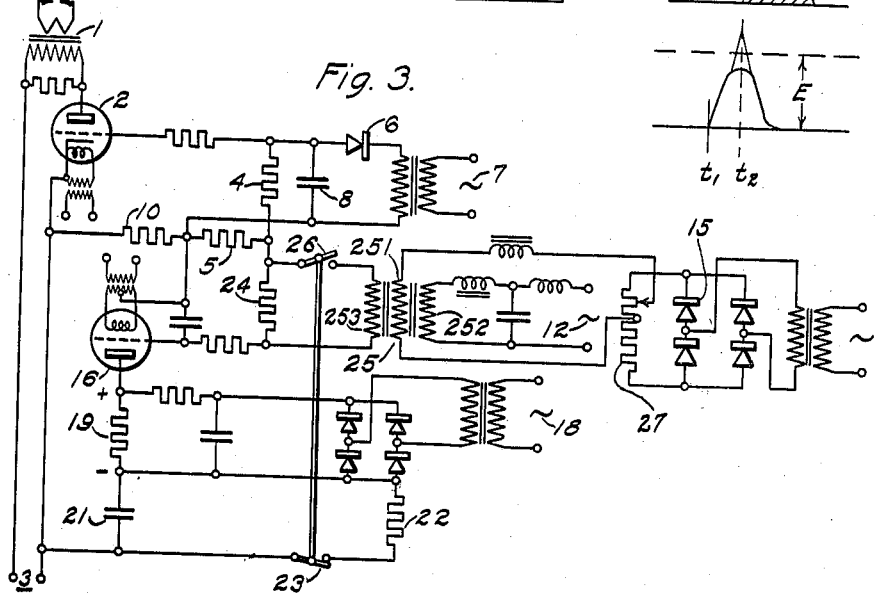
Fig. 3 is a diagrammatic view showing a modification of my invention.

The exemplary embodiment of the invention illustrated in Fig. 3 corresponds to a large extent to the circuit according to Fig. 1. For this reason corresponding circuit parts are identified by the same references in Fig. 3. The difference between the two circuits consists in the circuit according to Fig. 3 the resistor 9 in the grid circuit of the main discharge vessel 2 and associated transformer 11 are lacking. In addition the choke coil in the circuit of the auxiliary discharge vessel 16 is lacking.

The variable potential peaks, which act opposite to the negative direct current potential of the two resistors 4 and 5 in the grid circuit of the main discharge vessel 2, is, in the circuit of Fig. 3, supplied only by the potential of the resistor 10. This resistor and the direct current source on resistor 19 feeding it as well as the capacitor 21 are so dimensioned that at the ignition of the auxiliary discharge vessel 16 a potential peak appears on resistor 10 which is sufficient to ignite the main discharge vessel 2. The time point of this potential peak is again determined by the time point of the potential peak in the secondary of the transformer 25 which is connected in the grid circuit of the auxiliary discharge vessel 16. After the ignition of the auxiliary discharge vessel 16 the potential of the resistor 10 decreases steeply because the capacitor 21 is charged. The discharge vessel 16 is thereby deprived of anode potential. The arc in this discharge vessel is extinguished even if, with the auxiliary switch 26 closed, potential peaks continue to appear on the resistor 24 in the grid circuit of the auxiliary discharge vessel 16. As in the circuit of Fig. 1, a new welding process can only be started when, by closing the auxiliary contact 23, the capacitor 21 in the circuit of the auxiliary discharge vessel 16 is discharged.

Figure 4:
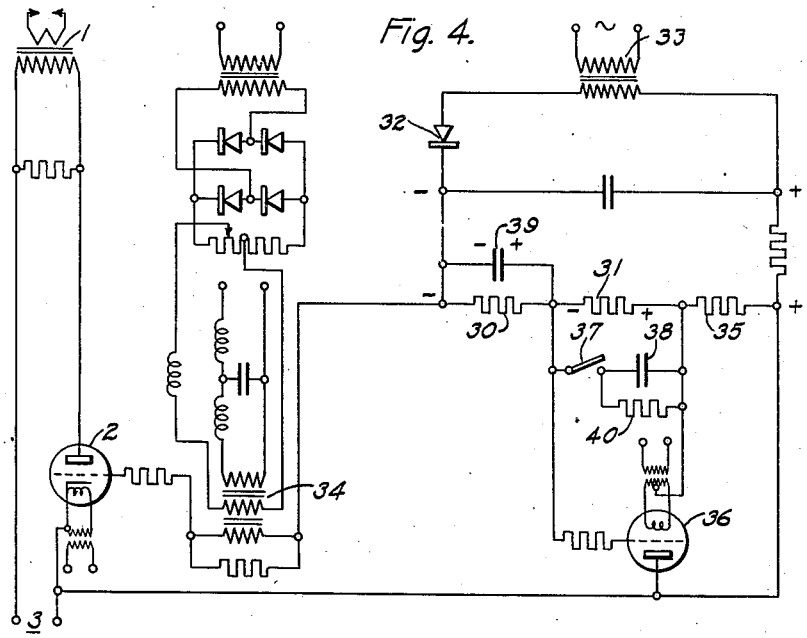
Fig. 4 is a diagrammatic view showing another modification of my invention.

In the exemplary embodiment of Fig. 4 the welding transformer 1 is connected to the alternating current network 3 through a grid controlled arc discharge vessel 2, and indeed a single anode hot cathode vessel just as in the circuits of Figs. 1 and 3. In the grid circuit of the discharge vessel 2 at first a negative direct current potential and a potential peak, the frequency of which is equal to that of the network potential 3 act unchanged, that is, independent of the position of the auxiliary switch starting the welding process. The negative blocking potential is delivered by two resistors 30 and 31 which are connected to an alternating current potential source 33 through a rectifier 32. The potential peaks are produced by transformer 34 which is constructed just as the transformers 11 and 25 in the circuit according to Fig. 1. Accordingly the transformer 34 has a direct current exciting winding and an alternating current exciting winding. The magnitude of the direct current exciting current is adjustable in order to make possible the changing of the phase position of the potential peaks with reference to the potential of the alternating current network potential 3. The alternating current exciting winding is provided with a constant, preferably triangular shaped, exciting current.

To vary the grid potential of the discharge vessel 2 a resistor 35 is connected in the grid circuit in accordance with the invention; the resistor is connected to the alternating current source 33 through the rectifiers 32 just as the two resistors 30 and 31. The potential of the resistor 35 is varied by igniting the discharge vessel 36 which is connected in parallel to the resistor. The auxiliary discharge vessel is a gas or vapor filled discharge vessel accordingly for example a hot cathode tube with mercury vapor filling. In the grid circuit of the auxiliary discharge vessel the auxiliary switch 37 for starting the welding process is connected. When this switch is closed the negative blocking potential of resistor 31 for the discharge vessel 36 is rendered inactive by connecting the capacitor 38 in parallel with the resistor 31. The auxiliary discharge vessel is ignited and the potential of the resistor 35 is short-circuited, and the total negative potential effective in the grid circuit of the main discharge vessel decreases to a value of such magnitude that the potential peaks of the transformer 34 may ignite the discharge vessel 2. The first potential peak of this transformer appearing after the closing of the auxiliary switch 37 accordingly ignites the main discharge vessel 2. At the same instant an auxiliary circuit is closed which extinguishes the auxiliary discharge vessel 36. The auxiliary circuit extends from the discharge vessel 36 through the cathode-grid circuit of the main discharge vessel 2, the secondary winding of the transformer 34, the capacitor 39 and the resistor 31 back to the auxiliary discharge vessel 36. Through this auxiliary circuit the capacitor 39 is discharged it having been charged before through the potential of the resistor 30. The discharge current is of such polarity that it is opposite to the current flowing in the auxiliary discharge vessel 36 and causes this discharge vessel to become extinguished. A further ignition of the discharge vessel 36 is not possible even if the auxiliary discharge switch 37 is closed because in the meantime the capacitor 38 is charged to the potential of the resistor 31 and the control grid of the auxiliary discharge vessel 36 is supplied with blocking potential. Only when the auxiliary switch 37 is again opened may the capacitor 38 be discharged through the parallel resistor 40. The circuit arrangement is then in its "rest" condition. The auxiliary discharge vessel 36 may be again ignited by connecting the auxiliary switch 37.

Figure 5:
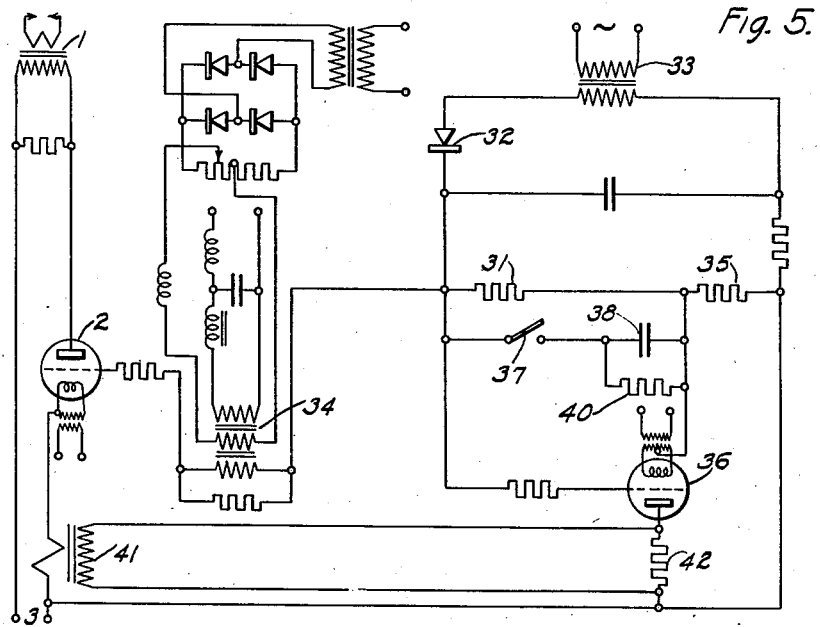
Fig. 5 is a diagrammatic view showing a further modification of my invention.

The examplary embodiment according to Fig. 5 corresponds to a large extent with the circuit of Fig. 4. The corresponding circuit parts of the two circuits are therefore provided with the same reference identifications. Also in the circuit of Fig. 5 the negative direct current potential of the resistor 31 and the potential peaks of the resistor 34 act in the grid circuit of the main discharge vessel 2 unchanged; the potential peaks may be displaced with reference to the potential of the network 3 by varying the direct current magnetization of the transformer 34. The discharge vessel 2 is ignited by short-circuiting the resistor 35 in the grid circuit through the auxiliary discharge vessel 36. The difference from the circuit of Fig. 4 consists in the fact that the auxiliary discharge vessel 36 is extinguished not by a capacitor charging but by an auxiliary potential which is derived from the circuit of the main discharge vessel 2. For this purpose a resistor 42 is connected in the anode circuit of the auxiliary discharge vessel 36 and the resistor is connected to the current transformer 41 in the welding circuit. As soon as the main discharge vessel 2 is ignited, the current transformer 41 produces a counterpotential in the resistor 42 by the operation of which the auxiliary discharge vessel 36 is extinguished. The extinction of the auxiliary discharge vessel is accordingly made dependent on the ignition of the main discharge vessel in the circuit according to Fig. 5.

Figure 6:
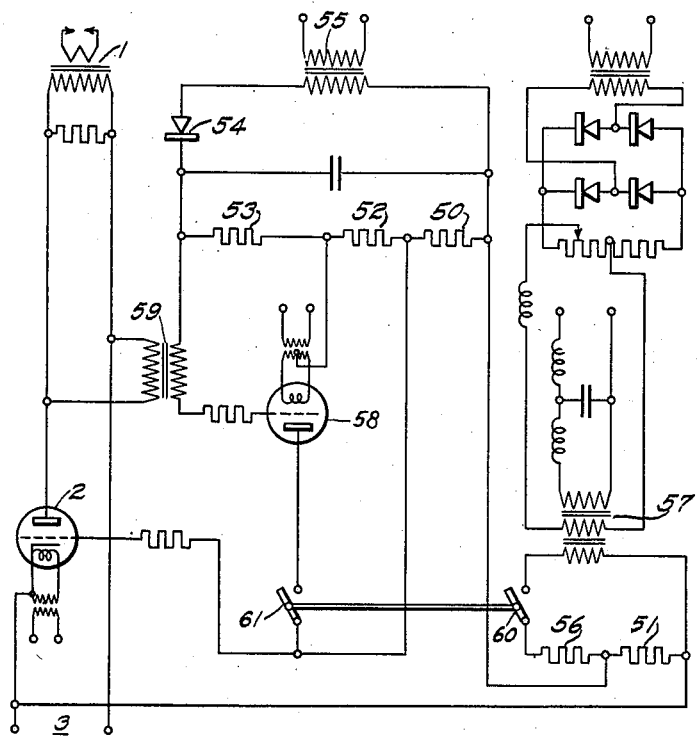
Fig. 6 is a diagrammatic view showing a still further modification of my invention.

In the exemplary embodiment according to Fig. 6, a welding transformer 1 is also connected through a single anode grid controlled discharge vessel 2 to an alternating current network just as in the circuits of Figs. 1, 3, 4 and 5. As in the circuits of Figs. 4 and 5, a negative direct current potential of resistor 50 and the potential peaks function, in the grid circuit of the discharge vessel 2, unchanged, the peak potentials appearing on a resistor 51. The resistor 50 is connected in series with further resistors 52 and 53 through a rectifier 54 to the alternating current source 55. The resistor 51 is in series with a resistor 56 connected to the secondary winding of a transformer 57 that is constructed and connected similar to the transformers 11 and 25 in the circuit of Fig. 1. To change the grid potential of the discharge vessel 2 or to ignite it, the resistor 52, which may be short-circuited through the auxiliary discharge vessel 58, serves. In the grid circuit of the auxiliary discharge vessel are supplied the negative blocking potential of the resistor 53 and the alternating current potential of transformer 59 which is dependent on the potential of the welding transformer 1. To start the welding process the two auxiliary switches 60 and 61 serve; these switches are positively coupled to each other, the operation of the circuit is as follows:

After the closing of the two auxiliary switches 61 and 60 the main discharge vessel is ignited as soon as the potential peaks produced by the transformer 57 appear on the resistor 51. The phase position of the potential peaks with reference to the alternating current potential of the network 3 depends on the direct current excitation of the transformer 57. At the instant at which the main discharge vessel is ignited the auxiliary discharge vessel 58 is also ignited through the transformer 59 and thereby the resistor 52 in the circuit of the rectifier 54 is short-circuited. The current in this circuit rises because of this and increases the potential drop of the resistor 50 and indeed by so much that the main discharge vessel 2 is blocked. If after the termination of a period of the alternating current network the potential peak of the transformer 57 returns, the main discharge vessel 2 is not ignited again because in the meantime the blocking potential of the resistor 50 has become larger than the potential peaks of the resistor 51.

I claim as my invention:

1. In combination, a discharge device having a plurality of principal electrodes and a control electrode and a gaseous medium, means for impressing a potential between said principal electrodes, means for impressing between said control electrode and one of said principal electrodes a potential of substantially peaked wave form that is of such magnitude that said device is non-conductive when subjected to it alone, means comprising an impedance in circuit with an auxiliary discharge tube for rendering said control electrode more positive as a result of current flow through said auxiliary discharge tube, and means energized by a transformer having a primary in series with said principal electrodes to render said auxiliary discharge device non-conductive in response to current flow in the first-named discharge device.

2. In combination, a discharge device having a plurality of principal electrodes and a control electrode and a gaseous medium, means for impressing a potential between said principal electrodes, means for impressing between said control electrode and one of said principal electrodes a biasing potential of such magnitude that said device is non-conductive when subjected to it alone, means including an impedance in the circuit of said control electrode tending to make said control electrode less positive in response to current flow through said impedance, and means responsive to current flowing between said principal electrodes to render the potential impressed by said impedance on said control electrode more positive.

3. In combination, a discharge device having a plurality of principal electrodes and a control electrode and a gaseous medium, means for impressing a potential between said principal electrodes, means for impressing between said control electrode and one of said principal electrodes a biasing potential of such magnitude that said device is non-conductive when subjected to it alone, a resistor connected in the circuit of said control electrode, an auxiliary tube rendered conductive by a control switch to cause current flow through said resistor of such a direction and magnitude as to produce current flow between said principal electrodes, and means responsive to current flow between said principal electrodes to so alter the current flow through said resistor as to cause a decrease of current flow between said principal electrodes.

4. Device according to claim 3 characterized by the fact that the last-mentioned means embodies a transformer in the circuit of said principal electrodes.

5. In combination, an alternating current circuit, a load circuit, electric translating apparatus connected between said circuits and comprising electric valve means for controlling the transfer of energy therebetween, said electric valve means including a control member for controlling the conductivity thereof, a control circuit including means for producing a periodic voltage of peaked wave form and switching means for connecting said means in operative relation with said control member, and means responsive to the energization of the load circuit for effecting connection of said control circuit to said control member for only a predetermined number of cycles of voltage of said alternating current circuit.

RICHARD SCHNARZ.